United States Patent
Pahnke

(10) Patent No.: US 11,930,955 B2
(45) Date of Patent: Mar. 19, 2024

(54) DEVICE AND METHOD FOR PRODUCING A BREWED BEVERAGE

(71) Applicant: MELITTA SINGLE PORTIONS GMBH & CO. KG, Minden (DE)

(72) Inventor: Jan Pahnke, Minden (DE)

(73) Assignee: MELITTA SINGLE PORTIONS GMBH & CO. KG, Minden (DE)

( * ) Notice: Subject to any disclaimer, the term of this patent is extended or adjusted under 35 U.S.C. 154(b) by 595 days.

(21) Appl. No.: 16/965,501

(22) PCT Filed: Feb. 5, 2019

(86) PCT No.: PCT/EP2019/052737
§ 371 (c)(1),
(2) Date: Jul. 28, 2020

(87) PCT Pub. No.: WO2019/170337
PCT Pub. Date: Sep. 12, 2019

(65) Prior Publication Data
US 2021/0045570 A1 Feb. 18, 2021

(30) Foreign Application Priority Data

Mar. 7, 2018 (DE) .......................... 102018105213.8

(51) Int. Cl.
*A47J 31/40* (2006.01)
*A47J 31/36* (2006.01)
(Continued)

(52) U.S. Cl.
CPC ......... *A47J 31/407* (2013.01); *A47J 31/3633* (2013.01); *A47J 31/3638* (2013.01); *A47J 31/4492* (2013.01); *A47J 31/60* (2013.01)

(58) Field of Classification Search
CPC .. A47J 31/407; A47J 31/3633; A47J 31/3638; A47J 31/4492; A47J 31/60
See application file for complete search history.

(56) References Cited

U.S. PATENT DOCUMENTS 10,405,691 B2   9/2019  Hesselbrock et al.
2011/0189350 A1* 8/2011  Van Belleghem ..........................
                                              B65D 85/8064
                                              99/289 R
(Continued)

FOREIGN PATENT DOCUMENTS

DE   102014109760 A1   1/2016
EP       2112093 A1   10/2009
(Continued)

OTHER PUBLICATIONS

International Search Report in corresponding International Patent Application PCT/EP2019/052737, dated Apr. 23, 2019, 2 pages.
(Continued)

*Primary Examiner* — Nathaniel E Wiehe
*Assistant Examiner* — Keith Brian Assante
(74) *Attorney, Agent, or Firm* — FisherBroyles, LLP; Robert Kinberg

(57) ABSTRACT

A device for producing a brewed beverage comprises a brewing chamber which has an inlet for hot water and an outlet, the outlet being coupled to a closing element by which the outlet can be opened or closed. The brewing chamber has a lateral opening on which a capsule containing an extraction material can be placed in a sealed manner in order to produce a fluid connection between an interior of the capsule and an interior of the brewing chamber. An edge of the lateral opening forms a plane that is oriented at an angle to a vertical plane.

10 Claims, 3 Drawing Sheets

(51) Int. Cl.
*A47J 31/44* (2006.01)
*A47J 31/60* (2006.01)

(56) References Cited

U.S. PATENT DOCUMENTS

| | | | |
|---|---|---|---|
| 2015/0272377 A1* | 10/2015 | Doglioni Majer .. | A47J 31/3638 |
| | | | 99/295 |
| 2016/0157668 A1* | 6/2016 | Bugnano ............. | A47J 31/4492 |
| | | | 426/232 |
| 2017/0252991 A1 | 9/2017 | Wood et al. | |

FOREIGN PATENT DOCUMENTS

| | | | |
|---|---|---|---|
| EP | 2159167 A1 | 3/2010 | |
| EP | 3166452 A1 | 10/2019 | |
| WO | WO-2016005111 A1 * | 1/2016 | .............. A47J 31/36 |

OTHER PUBLICATIONS

German Search Report in corresponding German Patent Application No. 10 2018 105 213.8, dated Mar. 7, 2018, 13 pages with English translation.

\* cited by examiner

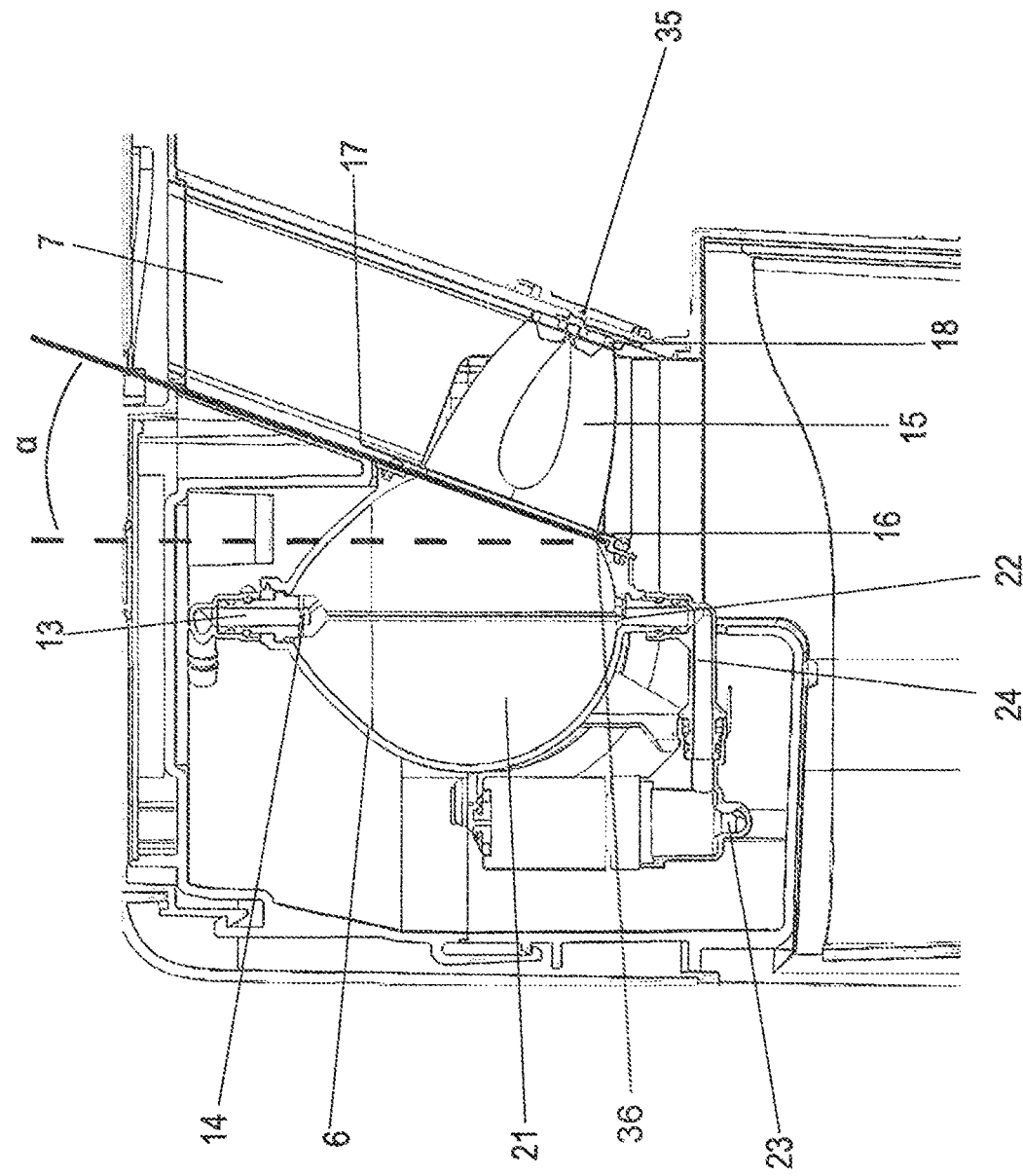

DEVICE AND METHOD FOR PRODUCING A BREWED BEVERAGE

CROSS-REFERENCE TO RELATED APPLICATIONS

This application is a United States National Stage Application of International Application No. PCT/EP2019/052737 filed Feb. 5, 2019, claiming priority from German Patent application No. 10 2018 105 213.8 filed Mar. 7, 2018.

BACKGROUND OF THE INVENTION

The present invention relates to a device for producing a brewed beverage, having a brewing chamber which has an inlet for hot water and an outlet, wherein a closure element is provided on the outlet by which the outlet can be opened or closed, and the brewing chamber has a lateral opening to which a capsule with an extraction material can be applied in a sealed manner in order to produce a fluid connection between an interior of the capsule and an interior of the brewing chamber, and a method for producing a brewed beverage.

European patent document EP 2 159 167 A1 discloses a device for producing a brewed beverage in which a capsule is positioned at a vertical lateral opening of a brewing chamber. The capsule is perforated at the bottom for a brewing operation, and hot water is injected into the capsule and then into the brewing chamber via an injection needle. If the liquid level is positioned above the injection needle to produce the brewed beverage, there may be leakage problems in the perforation area. In addition, after the brewing process, the capsule must be released from the lateral opening via an ejection mechanism, which is comparatively complicated.

German patent document DE 10 2014 109 760 A1 discloses providing an inlet for the introduction of hot water at an upper side of the brewing chamber. In the brewing position, the capsule is located at a vertical opening of the brewing chamber and when the brewed beverage is dispensed, the liquid flows from the capsule to a lower part of the brewing chamber to an outlet. Since the extraction material is still wetted with liquid for a longer period of time even while the brewed beverage is being dispensed, a larger amount of bitter substances can enter the brewed beverage at the end of the dispensing process than at the beginning of the dispensing process, since the extraction material is still wetted with a residual liquid for a longer period of time, which is passed to the outlet with a time delay. This can lead to an impairment in respect of taste. In addition, the capsule with the extraction material has a low dead weight and this can lead to problems when removing the capsule from the brewing position.

SUMMARY OF THE INVENTION

It is therefore an object of the present invention to create a device and a method for the production of a brewed beverage, which allow an exact adjustment of a brewing time of the extraction material and ensure easy handling when removing the capsule from the brewing position.

The above and other objects are accomplished with a device for producing a brewed beverage, which in one embodiment comprises: a brewing chamber having an inlet for hot water and an outlet, the outlet being arranged to be coupled to a closure element by which the outlet can be opened or closed; wherein the brewing chamber has a lateral opening to which a capsule with an extraction material can be applied in a sealed manner in order to produce a fluid connection between an interior of the capsule and an interior of the brewing chamber, wherein the lateral opening includes an edge that forms a plane which is oriented inclined to a vertical plane.

In the device according to the invention, a capsule is placed in a brewing position in a sealed manner against a lateral opening of a brewing chamber in order to establish fluid connection between an interior of the capsule and the brewing chamber, wherein an edge of the lateral opening forms a plane which is oriented inclined to the vertical. This allows the brewing time to be precisely set to when the brewing process is ended and the brewed beverage is dispensed, which delays or avoids a delayed run of residual liquid from the capsule. In addition, the inclination of the capsule with respect to the rim that is placed against the lateral opening can be used to weight the capsule with residual liquid, which makes it easier to dispense the capsule after the brewing process and feed it to a collecting container. This increases the process reliability and avoids the provision of an elaborate ejection mechanism.

The plane of the edge of the lateral opening is preferably oriented at an angle between 5° and 45°, in particular 10° to 30°, to the vertical, i.e. a vertical plane. A shaft for feeding the capsule to the lateral opening may also be oriented inclined to the vertical, preferably at an angle similar or identical to the plane of the lateral opening. The inclination of the opening and optionally of the shaft is oriented so that the shaft and the opening are laterally away from a center point of the brewing chamber, i.e. a vertical line and a line in the longitudinal direction of the shaft are arranged to spread upwards.

In one embodiment, a lower edge of the lateral opening is designed as a threshold from which a lower wall of the brewing chamber slopes downward on one side of the threshold and from which a lower wall of the capsule slopes downward on the other side of the threshold. This allows a defined amount of residual liquid to be collected in the capsule when the brewed beverage is dispensed. Due to the inclination of the lower wall of the capsule, this liquid is no longer directed to the outlet with a time delay but remains in the capsule. The residual liquid increases the weight of the capsule when the capsule is removed from the brewing position, for example between 1 g and 10 g, so that ejection by gravity is optimized and sticking or jamming of the capsule can be avoided.

The capsule is preferably designed in a pot-shaped manner and has a rim on one upper side which can be placed in a sealed manner against a rim on the lateral opening. A suitable seal can be provided on the edge of the lateral opening of the brewing chamber for this purpose. Furthermore, a filter element, for example a sieve, is preferably provided on the capsule, which, although it establishes a fluid connection between an interior of the capsule and an interior of the brewing chamber, holds the extraction material within the capsule. A coding is preferably provided on a base of the capsule, which can be detected or read by a reader in order to identify different types of capsules and thereby be able to control, for example, the brewing time or the water temperature.

According to another aspect of the invention there is provided a method which in one embodiment includes: positioning a capsule at a lateral opening of a brewing chamber for establishing a fluid connection between an interior of the capsule and an interior of the brewing chamber, wherein an edge of the lateral opening forms a plane which is inclined to a vertical plane, for example at an angle between 5° to 45°, in particular 10° to 30°. Hot water is then introduced into the brewing chamber in order to brew a beverage which, after a brewing time, for example between 1 minute and 5 minutes, is discharged from the brewing chamber to an outlet in order to dispense the brewed beverage. The inclined arrangement of the capsule can reduce or prevent delayed flow when dispensing the beverage, and the residual liquid in the capsule can also be used to make it easier to remove it from the brewing position. The amount of residual liquid retained in the capsule after dispensing the brew is preferably between 1 ml and 10 ml, in particular 2 ml to 6 ml.

BRIEF DESCRIPTION OF THE INVENTION

The invention is explained in more detail below by means of an embodiment example with reference to the attached drawings, wherein:

FIG. 3 shows a sectional detail view of the brewing chamber with a capsule in the brewing position.

DETAILED DESCRIPTION

Figure 1:
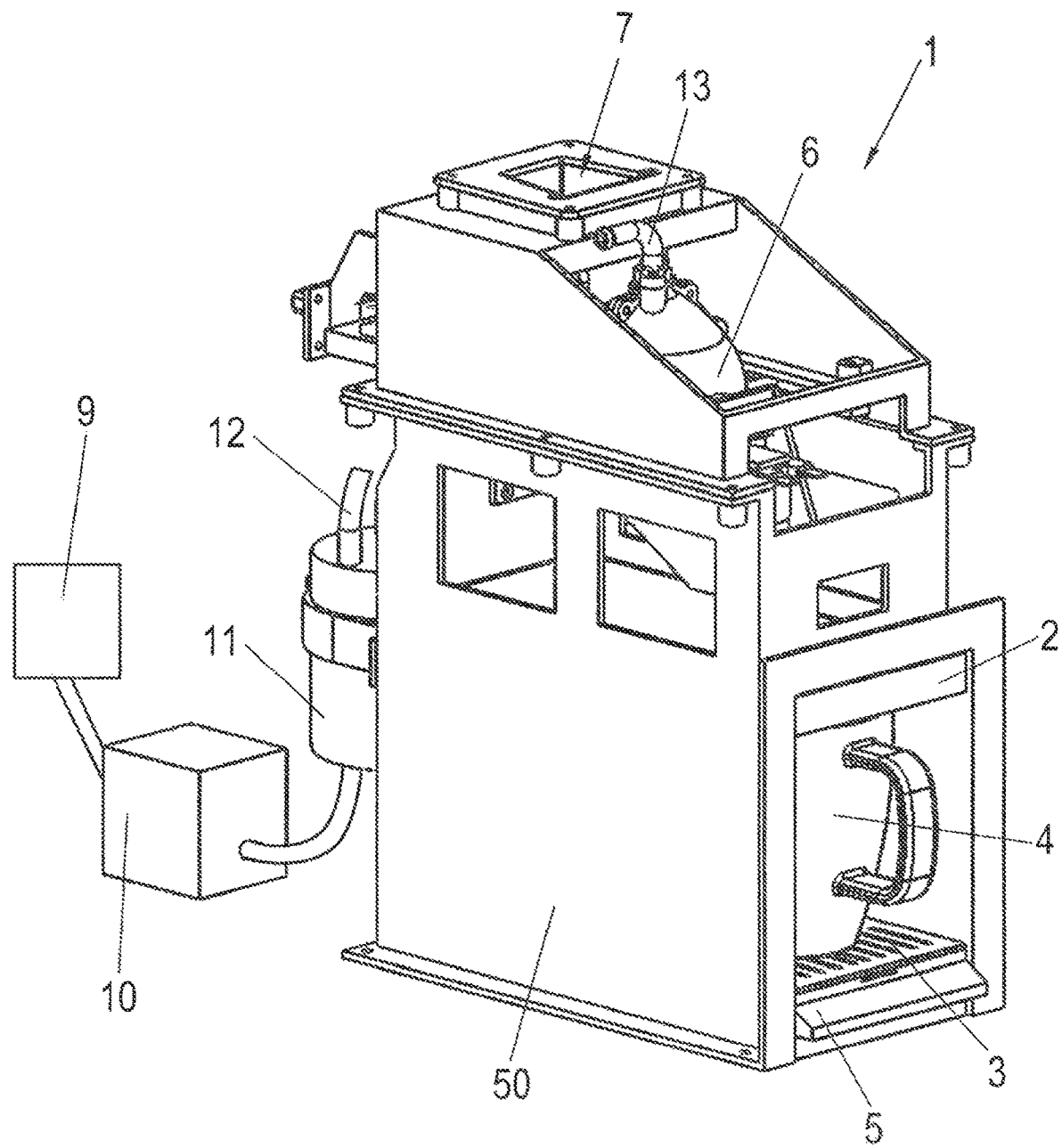
FIG. 1 shows a perspective view of a device according to the invention for preparing a brewed beverage.

Referring to FIG. 1, there is shown a device 1 for preparing brewed beverages comprises a removable collecting container 2, which is arranged in a housing 50. The collecting container 2 preferably consists of two parts: a container with a water-permeable bottom for collecting capsules and a container underneath for collecting water. A support 3 with openings for depositing a receptacle 4 is arranged on the collecting container 2. Below the support 3 there is a handle section 5 for pulling out the collecting container 2.

Device 1 for preparing brewed beverages further comprises a brewing chamber 6, which is provided next to a shaft 7 for inserting a capsule.

Figure 2:
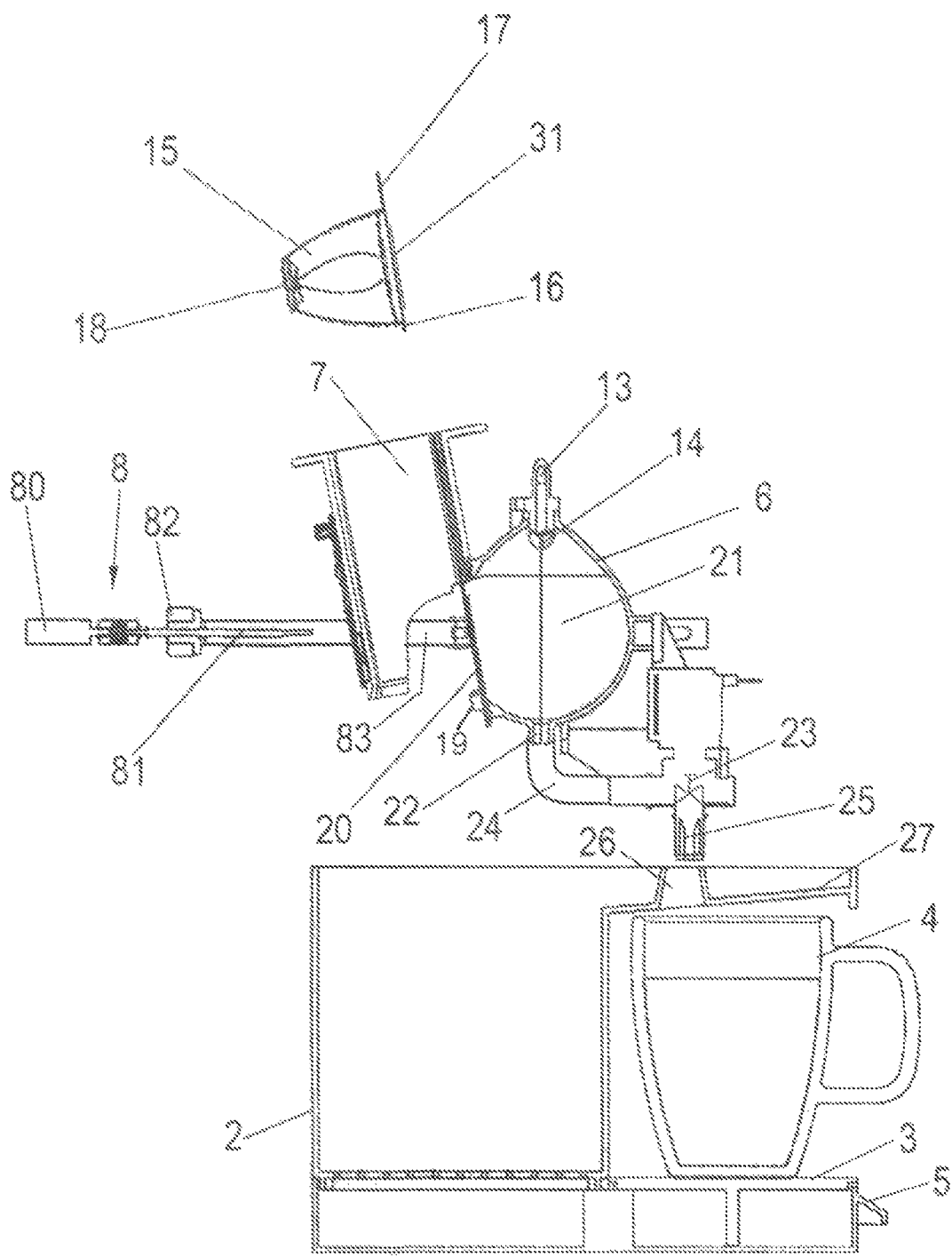
FIG. 2 shows a sectional view of the device in FIG. 1 without the housing.

As shown in FIG. 2, the shaft 7 for capsules is located between the brewing chamber 6 and a drive device 8. The brewing chamber 6 can be moved relative to the shaft 7 via the drive device 8. An electric motor 80 is provided for this purpose, which drives a spindle 81 via a gear unit, on which a spindle nut 82 is non-rotatably mounted. By turning the spindle 81, arms 83 connected to the spindle nut 82 are moved linearly. The arms 83 embrace the brewing chamber 6 on opposite sides and are linearly guided. The brewing chamber 6 can thus be moved linearly or along a cam guide relative to the housing 50, although other drives can also be used.

Referring again to FIG. 1, the device 1 for preparing brewed beverages also includes a schematically shown tank 9 for fresh water, which may be designed to be removable. The tank 9 is connected to a pump 10 which feeds a heating device 11 in the form of a boiler. From the heating device 11, a line 12, which is only partially shown in FIG. 1, leads to an inlet line 13 above the brewing chamber 6. A filter may optionally be provided between the inlet line 13 and tank 9.

FIG. 2 shows a capsule 15 above the shaft 7, wherein the capsule is designed in a pot-shaped manner and has an opening on one side which is closed with a sieve 31 or a filter. The sieve 31 is fixed to an edge 16, which is asymmetrically designed and has a protruding section 17 as a grip area on one side. By likewise asymmetrical guide means on a lateral wall of the capsule 15 (see FIG. 3), the latter is inserted and guided in a predetermined position and orientation into the shaft 7, which has a corresponding guide means for positioning the capsule 15. The shaft 7 is inclined to the vertical by an angle α and extends downwards to the brewing chamber 6.

On the opposite side to the opening, the capsule 15 has a bottom 18 with markings or codes to identify the capsule 15. Such markings may be color coding, optical coding, electromagnetic coding or otherwise designed to identify a particular type of capsule in a predetermined position. By reading out the coding of the capsule 15 on the device, the filling quantity of hot water for the brewing chamber 6, the temperature and/or the dwell time can be adjusted via a control unit. It is also possible to control other parameters via the coding.

For the brewing process, the capsule 15 is first inserted into the top of shaft 7. The capsule 15 slides downwards until it is positioned at a lateral opening 20 of the brewing chamber 6, which is in the insertion position. For this purpose, at least one holder 19 is provided on the outside of the brewing chamber 6 to prevent the capsule 15 from sliding down over the brewing position at the opening 20. Then the brewing chamber 6 is laterally moved by the above described drive device 8 into the brewing position shown in the sectional view of FIG. 3. In this process, the brewing chamber 6 is moved with a seal around the opening 20 against the edge 16 of the capsule 15 to provide sealing. The capsule 15 and an interior 21 of the brewing chamber 6 thus form a unit that can be flowed through, wherein the capsule 15 is located outside the brewing chamber, wherein the interior 21 of the brewing chamber 6 and the interior of the capsule 15 are separated from each other by sieve 31. The interior 21 of the brewing chamber 6 is many times larger than an interior of the capsule 15, for example more than four times larger, so that the brewed beverage is predominantly in the brewing chamber 6 and only a smaller part in the capsule 15.

In the brewing position, hot water from the heating device 11 is now fed into the brewing chamber 6 via the inlet line 13 as an inflow, wherein a nozzle 14 is provided for this purpose at the end of the inlet line 13, which projects with a tip into the interior 21 of the brewing chamber 6 and by means of which hot water is introduced for the brewing process or for the rinsing process. For this purpose, the nozzle 14 has several openings distributed around its circumference through which the hot water can be injected into the brewing chamber 6. This creates a liquid film on the side walls of the brewing chamber 6 which can be used for rinsing on the one hand and for the brewing process on the other hand. In addition, there is at least one opening at the bottom of the nozzle 14 through which hot water can be injected, for example if hot water is to be topped up during the brewing process. In another embodiment, the additional opening of the nozzle is designed diagonally in the direction of the capsule in the brewing position, as shown in FIG. 3. The openings can be optionally designed to be switchable via valves.

Brewing chamber 6 has an outlet 22 or drain at the lower end, which is connected to a valve 23 via line 24. By closing the valve 23, the hot water introduced is collected in the brewing chamber 6 and rises through the outlet 22 to reach the material contained in the capsule 15 for brewing a beverage, especially tea. By reading the code on the capsule 15 beforehand by means of a reader 35 shown in FIG. 3, the preparation of the brewed beverage can be individually adapted via the control unit. For example, green tea can be prepared differently from black tea, fruit tea or another brewed or infused beverage. In addition, a cleaning program or a service program can be started by reading the code.

After the brewing process, the valve 23 can be opened so that the brewed beverage flows from the brewing chamber 6 via the outlet 22 and the line 24 into an outlet nozzle 25, from where it is introduced into a vessel 4. In the brewing position there is a passage 26 or an opening between the outlet nozzle 25 and the vessel 4 so that the hot beverage can flow unhindered into the vessel 4. After the brewed beverage has been dispensed, the valve 23 can be closed again.

After the beverage has been dispensed, the brewing chamber 6 can be moved away from the capsule 15 via the drive device 8 so that the capsule 15 is removed from the holding position adjacent to the lateral opening 20 on the brewing chamber 6. Initially it is still held by the holders on the brewing chamber, but as the brewing chamber moves, it tilts relative to the shaft 7 and finally falls down in a controlled and reproducible manner. The capsule 15 falls into the collecting container 2 onto a sieve or a grid, which is arranged above a collecting basin. By moving the brewing chamber 6, the valve 23, the line 24 and the outlet nozzle 25 are also moved at the same time. The outlet nozzle is now no longer located above the passage 26, but above a guide element 27. Now the brewing chamber 6 can be rinsed by injecting hot water from the heating device 11 via the nozzle 14 into the brewing chamber 6 so that the hot water can remove residues of the brewing process. The hot water can partly be introduced into the collecting container 2 directly through the opening 20 and is otherwise introduced via the outlet 22 and the line 24 into the outlet nozzle 25. From there the rinsing water reaches the guide element 27, which is designed as a sloping bottom surface above the vessel 4. Via the guide element 27 the rinsing water reaches a collecting basin 28 of the collecting container 2. The guide element 27 can also be designed as a channel or groove instead of a sloping bottom surface.

If a small amount of liquid is introduced through passage 26 after vessel 4 has been removed, this liquid can be collected in a second collection basin or drip tray. The collecting container 2 can be removed as a unit from the housing 50 of device 1 so that the two collecting basins can be emptied at the collecting container 2.

The brewing chamber 6 is essentially spherical in shape and has a parabolic section in the upper area where nozzle 14 is provided.

Brewing chamber 6 can hold a volume of between 0.1 and 1.0 liter (l), in particular 0.15 l to 0.7 l, depending on how many portions of the brewed beverage are to be prepared at one time.

The electric drive unit 8 allows the capsule 15 to be ejected automatically after the brewing process. This allows a rinsing process to be initiated after each brewing operation, thus preventing the surface of the brewing chamber 6, the outlet 22 and the line 24 from becoming dirty. Rinsing can be carried out automatically directly after the brewing process without the user having to trigger the rinsing process.

The capsule 15 has an interior which is closed by the sieve 31 or grating. In order to preserve the aroma of the contents of the capsule for longer, the sieve 31 or grating may be closed by a cover film which is fixed to the rim 16 and which is wholly or partially removed before being inserted into the shaft 7. At least one light deflector may be provided at the opposite bottom 18 and at least one decoupling surface may be used for an optical detection system. Light guides may be provided at the bottom 18 so that the emission of light into the bottom 18 of the capsule 15 can be detected by at least one light detector.

In the embodiment example shown, brewing chamber 6 is single-walled, for example made of plastic, metal or glass. However, it is also possible to insulate the brewing chamber 6 to increase the temperature resistance, for example with a covering of insulating material or a double-walled design. In this case, the brewed beverage can be dispensed at a sufficiently tempered temperature, even with long brewing times of, for example, over 5 minutes.

In FIG. 3, the capsule 15 has been moved through the inclined shaft 7 into the brewing position. The edge 16 of the capsule is in sealed contact with an edge of the lateral opening 20, wherein the lateral edge of the opening 20 is inclined at an angle α to the vertical, for example between 10° and 30°, in particular between 15° and 25°.

For a brewing process, hot water is fed into the interior 21 of the brewing chamber 6 via the inlet line 13 as an inlet, wherein the hot water also flows into an interior of the capsule 15 through a filter on the capsule 15. The extraction material in the capsule 15 can now brew for a desired time, for example between 1 min and 8 min, and then the brewed beverage is discharged into the vessel 4 via the outlet 22 and the line 24. A lower edge 36 at the lateral opening 20 forms a threshold, which is positioned higher than a lower wall of the capsule 15 and a lower area of the brewing chamber 6. This leaves a defined amount of residual liquid in the capsule 15, for example between 1 ml and 10 ml, which increases the weight of the capsule 15, so that when the brewing process is complete the capsule 15 can be removed more easily and ejected into the collecting container 2 by gravity. Any adhesion forces, for example on the edge of the capsule 15, are overcome by the weight of the capsule 15 after the brewing operation and ensure that the capsule 15 falls reliably from the brewing position. It is also prevented that wetted extraction material drains residual liquid into brewing chamber 6 with a time delay, which can lead to an increased concentration of bitter substances in the brewed beverage.

The invention claimed is:

1. A device for producing a brewed beverage, comprising:
a brewing chamber having an inlet for hot water and an outlet, the outlet being arranged to be coupled to a closure element by which the outlet can be opened or closed, wherein the brewing chamber has a lateral opening surrounded by an edge for sealing against a capsule with an extraction material arranged in a brewing position laterally of and outside the brewing chamber in order to produce a fluid connection between an interior of the capsule and an interior of the brewing chamber, wherein the edge of the lateral opening of the brewing chamber is in a plane which is inclined at an angle α that is between 5° and 45° to a vertical plane that is at a 90° angle with respect to a flat surface on which the device rests; and
a shaft arranged for supplying the capsule to the lateral opening of the brewing chamber, wherein the shaft is inclined to the vertical plane at substantially the same angle α as the edge of the lateral opening.

2. A device for producing a brewed beverage, comprising:
a brewing chamber having an inlet for hot water and an outlet, the outlet being arranged to be coupled to a closure element by which the outlet can be opened or closed, wherein the brewing chamber has a lateral opening surrounded by an edge for sealing against a capsule with an extraction material arranged in a brewing position laterally of and outside the brewing chamber in order to produce a fluid connection between an interior of the capsule and an interior of the brewing chamber, wherein the edge of the lateral opening of the brewing chamber is in a plane which is inclined at an angle between 5° and 45° to a vertical plane that is at a 90° angle with respect to a flat surface on which the device rests.

3. A combination comprising the device according to claim 1 and the capsule containing the extraction material, wherein in the brewing position in which the capsule is sealed to the lateral opening of the brewing chamber, a lower edge of the lateral opening forms a threshold from which a lower wall of the brewing chamber slopes downward on one side of the threshold and from which a lower wall of the capsule slopes downward on an opposite side of the threshold.

4. The combination according to claim 3, wherein the capsule has a pot-shaped configuration.

5. The combination according to claim 3, wherein the capsule has a bottom with a coding that can be detected by a reader in order to identify different types of capsules.

6. The combination according to claim 3, wherein in the brewing position, the capsule has a lower section which is arranged lower than a lowest point of the lateral opening.

7. The combination according to claim 3, wherein the capsule has a liquid-permeable filter or sieve which separates the interior of the brewing chamber from the interior of the capsule.

8. A method for preparing a brewed beverage with the device according to claim 1, comprising the following steps:
Positioning the capsule containing the extraction material outside of the brewing chamber for being sealed against the edge of the lateral opening of the brewing chamber for establishing the fluid connection between the interior of the capsule and the interior of the brewing chamber, wherein the edge of the lateral opening is in the plane inclined to the vertical plane;
feeding hot water into the brewing chamber;
brewing the beverage; and
opening the closure element on the outlet of the brewing chamber, and dispensing the brewed beverage through the outlet.

9. The method according to claim 8, including retaining a volume of residual liquid in the capsule after the brewed beverage is dispensed; and ejecting the capsule by gravity into a collecting chamber with the volume of residual liquid in the capsule.

10. The method according to claim 9, wherein the volume of the residual liquid is between 1 ml and 10 ml.

* * * * *